US012668453B2

(12) United States Patent
Ruhnke et al.

(10) Patent No.: US 12,668,453 B2

(45) Date of Patent: Jun. 30, 2026

(54) ELEVATOR SYSTEMS

(71) Applicant: Otis Elevator Company, Farmington, CT (US)

(72) Inventors: Jan Ruhnke, Berlin (DE); Felix Benjamin Donath, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1352 days.

(21) Appl. No.: 17/405,758

(22) Filed: Aug. 18, 2021

(65) Prior Publication Data

US 2022/0106153 A1 Apr. 7, 2022

(30) Foreign Application Priority Data

Oct. 2, 2020 (EP) .................................... 20199901

(51) Int. Cl.

*B66B 1/24* (2006.01)
*B66B 1/34* (2006.01)
(Continued)

(52) U.S. Cl.

CPC .............. *B66B 1/24* (2013.01); *B66B 1/3492* (2013.01); *B66B 3/002* (2013.01); *B66B 5/02* (2013.01)

(58) Field of Classification Search

CPC ......... B66B 1/24; B66B 1/3492; B66B 3/002; B66B 5/02; B66B 5/0031; B66B 3/02; B66B 5/06; B66B 9/00

See application file for complete search history.

(56) References Cited

U.S. PATENT DOCUMENTS 4,520,904 A * 6/1985 Rado ...................... B66B 1/405 187/291
2016/0039635 A1* 2/2016 Kangas ..................... B66B 3/02 187/277
(Continued)

FOREIGN PATENT DOCUMENTS

CN 102730506 A 10/2012
CN 102869594 A * 1/2013 ........... B66B 1/3492
(Continued)

OTHER PUBLICATIONS

European Search Report for Application EP 20199901.8, dated Mar. 15, 2021, 57 pages.
(Continued)

*Primary Examiner* — Bickey Dhakal

(74) *Attorney, Agent, or Firm* — CANTOR COLBURN LLP

(57) ABSTRACT

An elevator system (201) includes an elevator car (203), a controller (215), a position reference system (234; 213) configured to provide a position of the elevator car (203) and at least one safety device (230) configured to indicate a potential hazard within the elevator system (201). When the actual position of the elevator car (203) cannot be determined using the position reference system (234), the controller (215) is configured to calculate at least one potential position of the elevator car (203) based on an assumed motion profile (237). The controller is configured to allow the elevator car (203) to move whilst no safety device (230), which corresponds to the at least one potential position of elevator car (203) is triggered and to stop movement of the elevator car (203) when a safety device (230) which corresponds to the at least one potential position of the elevator car is triggered.

14 Claims, 9 Drawing Sheets

(51) Int. Cl.
*B66B 3/00* (2006.01)
*B66B 5/02* (2006.01)

(56) References Cited

U.S. PATENT DOCUMENTS

2016/0280508 A1 9/2016 Roussel
2020/0339381 A1* 10/2020 Viljanen ............... B66B 1/3492

FOREIGN PATENT DOCUMENTS

EP 0698574 A2 * 2/1996 ............. B66B 1/285
GB 2063522 A 6/1981
JP 6351391 B2 7/2018
WO 2009008049 A1 1/2009

OTHER PUBLICATIONS

Chinese Office Action for Application No. 202110818613.6, Issued Jul. 31, 2024, 7 Pages.

* cited by examiner

ELEVATOR SYSTEMS

FOREIGN PRIORITY

This application claims priority to European Patent Application No. 20199901.8, filed Oct. 2, 2020, and all the benefits accruing therefrom under 35 U.S.C. § 119, the contents of which in its entirety are herein incorporated by reference.

TECHNICAL FIELD

This disclosure relates to elevator systems and methods, for example to elevator systems and methods for operating an elevator car when the position of the elevator car cannot accurately be determined.

BACKGROUND ART

Elevator systems comprising an elevator car typically rely upon accurate information regarding the position of the elevator car within the elevator shaft, in which it travels. Accurate positional information allows the system to control movement of the elevator car and stop the elevator car at appropriate positions in the elevator shaft, e.g. at elevator landings. Knowledge of the precise position of the elevator car is also important so that the system can quickly stop the elevator car in emergencies, e.g. following the triggering of an emergency sensor.

In certain instances, it may not be possible to accurately determine the position of the elevator car within the elevator shaft. For example, elevator shafts can become relatively dirty due to the generation of dust from the mechanical components within the elevator shaft. Dirt, e.g. dust, within the elevator system can make it difficult to accurately determine the position of the elevator car. For example, in systems which comprise a position reference system, e.g. an optical position reference system, dirt on the position reference system may prevent it from being able to accurately indicate the elevator car's position.

In prior art systems, as soon as the position of the elevator car can no longer accurately be determined, the system immediately assumes a worst case scenario and operates on the basis that the elevator car could be anywhere within the entire elevator shaft. In systems which comprise virtual limit switches, this worst case scenario typically causes the triggering of the virtual limit switches, e.g. an upper or lower virtual limit switch, which results in the immediate stopping of the elevator car. Whilst this may help to ensure the safety of any passengers within the elevator car, this immediate stopping of the elevator car can be a nuisance for passengers as the elevator car may be stopped between two landings, thus resulting in the passengers becoming trapped in the elevator car.

It would be advantageous to provide an elevator system which addresses the problems outlined above.

SUMMARY OF THE DISCLOSURE

In accordance with a first aspect, the present disclosure provides an elevator system comprising: an elevator car arranged within an elevator shaft; a controller configured to control movement of the elevator car; a position reference system configured to provide a position of the elevator car within the elevator shaft; and at least one safety device configured to indicate, when triggered, a potential hazard within the elevator system; wherein when an actual position of the elevator car cannot be determined using the position reference system, the controller is configured to: calculate at least one potential position of the elevator car based on an assumed motion profile of the elevator car; allow the elevator car to move whilst no safety device which corresponds to a potential position of elevator car is triggered; and stop movement of the elevator car when a safety device which corresponds to a potential position of the elevator car is triggered.

Thus it will be appreciated that aspects of the present disclosure provide an improved elevator system in which the elevator car may be allowed to continue to move within the elevator shaft, even in the event of a loss of actual, i.e. accurate, positional information. The elevator car may be allowed to move at least until a safety device is triggered which corresponds to a potential position of the elevator car. Of course, if the elevator is stationary at the time that the accurate position of the elevator car is lost, the elevator car may be allowed to remain stationary, or subsequently be moved, as required. The at least one potential position may be calculated based on the time elapsed from the point at which the actual position could not be determined.

It may be the case that it is only at a particular position, or range of positions, within the elevator shaft that the position reference system is not functioning properly. For example, this may be due to the presence of dirt on part of the position reference system. Therefore, by allowing the elevator car to move, the position of the elevator car may once again be accurately determined, when the elevator car moves to a position at which the position reference system is functioning properly, e.g. where there is no dirt impacting its functionality. Once the position of the elevator car can again be determined from the position reference system, the elevator system may continue to operate in a normal manner, i.e. in which movement of the elevator car is controlled based on its actual position. When the position cannot be accurately determined, the elevator system may be configured to generate a maintenance signal. Such a maintenance signal may comprise a maintenance message. Such a message may, for example, be sent to a service terminal of the elevator system such that maintenance personnel are informed. Maintenance may then be performed, e.g. by the clearing of dirt on the system, so that the position can accurately be determined by the position reference system.

Any suitable part of the elevator system may monitor the position of the elevator car. For example, the controller may be configured to monitor the position of the elevator car. Accordingly, when the controller can no longer accurately determine the position of the elevator car from the position reference system, it may then calculate the potential position of the elevator car as described above. Of course, other suitable means may be provided, such as a separate dedicated controller, for monitoring the position of the elevator car and suitably controlling the system.

The at least one safety device may comprise any device which is configured to indicate a potential hazard in the elevator system. For example, the at least one safety device may comprise any one of: emergency button stops, elevator car or landing door sensors and/or limit switches. The safety devices may be physical devices which are operable, e.g. by users of the system, or which are triggered by parts of the system, e.g. the opening of doors. Additionally, the safety devices may comprise virtual safety devices, e.g. virtual limit switches. For example, the at least one safety device may comprise a virtual upper limit switch, and a virtual lower limit switch. Such virtual limit switches may indicate that the elevator car is at the upper or lower limit of the elevator shaft. Such switches may, for example, automatically be triggered when the at least one potential position corresponds to a position at which the virtual switches are associated with. In other words, as soon as it is determined that a potential position of the elevator car is at an uppermost limit, or a lowermost limit, of the elevator shaft, the virtual upper or lower limit switch may be triggered. As will be appreciated, with the system disclosed herein, this will result in the stopping of the elevator car. The elevator car may be arranged to move between a plurality of landings within the elevator shaft.

Each of the at least one safety devices may be suitably referenced, e.g. within the controller, such that the controller is aware of the position of each safety device, or at least the position at which the safety device indicates a potential hazard. This may allow the controller to determine whether a triggered safety device corresponds to one of the potential positions. Additionally, each of the at least one safety devices may be referenced such that the type and/or purpose of the safety device is known by the controller. This information may be used by the controller when controlling movement of the elevator car.

Calculation of the at least one potential position of the elevator involves using an assumed motion profile of the elevator car. The assumed motion profile may represent the expected motion of the elevator car and may include any number of assumptions about the movement of the elevator car which can be used in calculating potential positions which the elevator car could at least theoretically have moved to. The assumed motion profile may comprise an elevator car speed component. The elevator car speed component may vary depending on the time elapsed since loss of actual position information. For example, the assumed motion profile may include an elevator car speed which may initially correspond to the speed at which the elevator car was moving prior to loss of the positional information, and which may also change based on the time elapsed since the loss of actual positional information.

In a set of examples, the assumed motion profile comprises an elevator car speed component which comprises a maximum possible speed of the elevator car. This maximum speed may thus be used when calculating the at least one potential position of the elevator car. The elevator car speed may initially be less than the maximum possible speed of the elevator car, but may follow an acceleration profile which reaches the maximum speed. Using the maximum possible elevator car speed and the time elapsed since the loss of position information, it may be possible to calculate the maximum distance the elevator car could have travelled. The elevator car may then, theoretically, be anywhere between its original position and a position corresponding to the maximum distance it could have travelled. As will be appreciated, in using a maximum possible speed, the assumed motion profile may thus work on 'worst case scenario' basis. The maximum possible speed for any given elevator car may be known and/or determined in advance and thus be included as part of the assumed motion profile. By assuming that the elevator car is moving at the maximum possible speed, this may contribute towards providing a maximum level of protection, as the at least one position will correspond to the furthest position that the elevator car could have moved to at in any given time. Of course, the car speed which may form part of the assumed motion profile may change depending on the time elapsed since the loss of positional information.

With regard to the varying speed, the motion profile may account for acceleration and deceleration of the elevator car. For example, following loss of actual position information, it may be assumed that the elevator car may accelerate up to a maximum speed, after which it then travels at the maximum speed. During the acceleration phase of such movement, the potential positions of the elevator car may be calculated based on different speeds at each time the potential speed is calculated at, taking into account the potential acceleration of the elevator car. In a similar manner, the elevator car may theoretically decelerate to a stop, at which point its travel direction may reverse. Accordingly, the assumed motion profile, and hence the calculated potential positions, may also take into account the potential that the elevator car may have to decelerate before it can move in an opposite direction. As such, at least initially during the deceleration phase, the potential positions may only be in the direction that the elevator car was initially travelling. After the point at which the motion profile, i.e. the deceleration component thereof, indicates that the elevator car could have come to stop, potential positions in the other direction may then be calculated.

The potential positions which the elevator car may be at may also depend on the direction of movement of the elevator car at the point at which its actual position was lost. Accordingly, in a set of examples, the motion profile comprises an expected direction of travel component of the elevator car. The expected direction of travel component may comprise the direction at which the elevator car was moving at the point of loss of actual positional information, i.e. the expected direction of travel may correspond to the initial direction of travel. For example, the assumed motion profile may comprise an upward or downward direction of travel.

In addition or alternatively, it may comprise both an upward and downward direction of travel such that potential positions in both directions are calculated. The upward and downward components of travel may contribute towards the calculation of the potential positions at different points in time. For example, if the elevator car was moving downward when its position was lost, the assumed motion profile may comprise an expected direction of travel component which indicates downward movement of the elevator car, but after a certain period of time potential positions may also be calculated in the upward direction to cover the scenario whereby the direction of the elevator car has reversed. The at least one potential position may then be calculated based on this and potential positions below the last known position, at least initially, may be calculated. Accounting for an expected direction of travel, e.g. an initial direction of travel, may allow more likely potential positions to be calculated, which may further reduce the likelihood of nuisance events as potential positions in a direction in which the elevator car is unlikely to be moving are not calculated, and thus safety devices which trigger in the opposite direction to which the elevator car is moving may not cause the elevator car to be stopped. The expected direction of travel component may vary based on the time elapsed since loss of positional information and may also be dependent on an initial speed of the elevator car at the point of loss of positional information.

In examples in which the assumed motion profile comprises a maximum possible speed, as discussed above, the maximum possible speed may be different in an upward direction compared to a downward direction. For example, the maximum possible speed in the downward direction may be higher than the maximum possible speed in the upward direction.

The assumed motion profile may be constant, i.e. it may comprise a single speed and single direction. However, alternatively, the motion profile may vary with time. For example, the expected speed may increase, e.g. up to a maximum, over time, and/or the expected travel direction may change over time. This may therefore allow the controller to calculate potential positions which more accurately reflect positions which the elevator car could feasibly be at.

As discussed above, the controller uses the assumed motion profile to calculate the at least one potential position of the elevator car. In calculating the at least one potential position, the controller may also use an initial reference position. The initial reference position may correspond to the last known position of the elevator car determined from the position reference system. This reference position may thus provide a position which, using the assumed motion profile, the at least one potential position can be based on.

In a set of examples, the at least one potential position of the elevator car comprises a plurality of potential positions. The plurality of potential positions may correspond to a specific time. For example, the controller may calculate a potential position in an upward direction, as well as a potential position in a downward direction, for any given time. In addition or alternatively, the plurality of potential positions may be calculated at different times so as to determine the potential positions as time elapses from the loss of the actual position of the elevator car. The controller may be configured to continuously determine the at least one potential position of the elevator car. However, in a set of examples, calculating the at least one potential position comprises calculating the at least one potential position periodically. The controller may, for example, be configured to calculate the at least one potential position periodically at a set period, e.g. every 5 ms or 100 ms or anywhere therebetween. Of course, any period may be used, and the frequency at which the potential positions are calculated may depend on the specific requirements of the elevator system. For example, the frequency at which the controller calculates the at least one potential position may depend on the particular elevator system, for example the number and position of the safety devices, and/or the potential speeds at which the elevator car may move. Thus, as time elapses from the point at which the actual position of the elevator car was lost, the controller may periodically determine at least one potential position of the elevator car. This may thus result in a plurality of potential positions being calculated thus resulting in a range of potential positions within the elevator shaft at which the elevator car could be located. The potential positions may be incrementally built up as time elapses, or they may be individually calculated each time. This plurality of potential positions calculated based on the elapsed time may take into account the fact that the elevator car could continue to move in one direction, move and stop, or even change direction completely.

For example, the elevator car may be at the $6^{th}$ level of a 20 level elevator shaft when the position of the elevator car is lost. Following this loss, the elevator controller may determine, e.g. after 2 seconds, that the potential positions of the elevator car include the elevator being at the $5^{th}$ level, $6^{th}$ level or the $7^{th}$ level. This may be based on the assumed motion profile including an expected speed corresponding to the elevator car moving one level every 2 seconds. Of course, the elevator car may not have moved, hence the inclusion of the $6^{th}$ level. After a further 2 seconds, if the actual position of the elevator car is not recovered, the controller may calculate that the elevator car could have travelled a further level and the calculated potential positions may thus comprise the $4^{th}$, $5^{th}$, $6^{th}$, $7^{th}$ or $8^{th}$ levels. At any point, if a safety device is triggered which corresponds to any one of these levels, e.g. a safety device associated with the landing doors on the $8^{th}$ level, the controller may then stop movement of the elevator car, irrespective of whether or not the elevator car is actual at the level. Therefore, by calculating a plurality of potential positions, e.g. periodically, maximum safety can be ensured as any safety device corresponding to any of the plurality of potential positions may cause the stopping of the elevator car.

The potential positions calculated by the controller may comprise a distance from a reference point, e.g. a pit, of the elevator shaft. For example, it may be calculated that following a position loss at 40 m from the pit of the elevator shaft, that the elevator car could be at any position between 35 m from the pit of the elevator shaft, through to 45 m from the pit of the elevator shaft, after 5 seconds from the position loss assuming that the elevator car travels at 1 m/s. Of course, the elevator car may travel at higher speeds, e.g. at 5 m/s and thus in the same time interval the elevator car could be at any position between 15 m from the pit through the 65 m from the pit of the elevator shaft. As discussed above, the assumed motion profile may include such speed information and the potential positions may therefore be calculated accordingly. With knowledge of the position of the safety devices within the elevator system, or at least the positons in the elevator shaft at which triggering of the sensor devices represents a danger, the potential positions may then be used in assessing whether a triggering of a sensor device requires stopping of the elevator car.

However, in many elevator systems, safety devices are typically associated with specific portions of the elevator shaft, often those that correspond to elevator landings. Accordingly, it may not be necessary to know a specific distance of the elevator car from the elevator shaft. Therefore, in a set of examples, each of the at least one potential position corresponds to at least one positional zone within the elevator shaft. For example, the positional zones may correspond to landings, i.e. levels, within the elevator shaft. Each potential position may thus correspond, for example, to a first, second, third landing etc. The positional zones may also include the uppermost portion and lowermost portion of the elevator shaft. At least some of the positional zones may have corresponding safety devices. When a safety device at a positional zone, or which indicates danger in a positional zone, is triggered and the at least one potential position includes a corresponding positional zone, the controller stops the elevator car. The use of positional zones may be a particularly convenient arrangement as many sensor devices within the elevator system may be arranged at the landings, such as on the landing doors thereof of as emergency stop at a landing.

In a set of examples, the position reference system comprises an absolute position reference system configured to provide an absolute position of the elevator car within the elevator shaft. The absolute position reference system may comprise any system which is capable, during normal operation, of providing an absolute position of the elevator car within the elevator shaft. It may, for example, comprise an optical or magnetic position reference system arranged in the elevator shaft. For example, the position reference system may an optical, e.g. camera-based, readout system. Such a system may comprise a series of markings, e.g. a code pattern, along the length of an elevator shaft, along with a camera arranged on the elevator car and configured to read the markings so as to enable determination of the absolute position of the elevator car within the shaft.

In an alternative example, the position reference system could comprise a magnetic-based system. Such a magnetic system may comprise a magnetic coded tape that runs along the length of the elevator shaft. The magnetic tape may be read, e.g. decoded, using at least one, e.g. a plurality of, Hall sensor(s) arranged on the elevator car, so as to determine the absolute position of the elevator car within the elevator shaft. Of course, any other suitable means may be used to enable determine the absolute position of the elevator car within the elevator shaft. The position reference system may also comprise an encoder arranged to monitor movement of an elevator machine. The encoder may be arranged to work in conjunction with the absolute position reference system to provide an actual position of the elevator car within the elevator shaft. The controller may be configured to calculate the at least one potential position of the elevator car when one or both of the absolute position reference system and encoder fail to function properly.

In a set of examples, the at least one safety device comprises a plurality of safety devices. Each of the plurality of safety devices may correspond to a position, i.e. a potential position, within the elevator shaft. Of course, more than one safety device may correspond to a position with the elevator shaft. In corresponding to a position, the safety device need not necessarily be physically arranged at said position, but correspond in a manner which means that triggering of the safety device is indicative of a potential danger at said position.

The elevator system may comprise an elevator machine configured to move the elevator car within the elevator shaft and a brake configured to act on the elevator machine to stop the elevator car from moving within the elevator shaft. The controller may thus be configured to apply the brake to stop the elevator car from moving within the elevator shaft.

According to another aspect of the present disclosure there is provided a method of controlling the operation of an elevator car within an elevator shaft comprising a plurality of safety devices configured to indicate a hazard in the elevator system, the method comprising: monitoring a position of the elevator car using a position reference system; when an actual position of the elevator car cannot be determined from the position reference system, calculating at least one potential position of the elevator car based on an assumed motion profile of the elevator car; and allowing the elevator car to move when no safety device is triggered which corresponds to the at least one potential position of the elevator car, and stopping the elevator car from moving when a safety device is triggered which corresponds to a potential position of the elevator car.

In some examples of the method, the assumed motion profile comprises an elevator car speed component comprising a maximum possible speed of the elevator car.

In some examples of the method, the assumed motion profile comprises a direction of movement component of the elevator car.

In some examples of the method, calculating at least one potential position of the elevator car also comprises using a last known position of the elevator car within the elevator shaft.

In some examples of the method, calculating the at least one potential position comprises calculating the at least one potential position periodically.

In some examples of the method, calculating the at least one potential position comprises calculating a plurality of potential positions.

In some examples of the method, the at least one potential position corresponds to positional zones within the elevator shaft.

Advantages of the elevator system detailed above equally apply to the method and associated examples set out herein. Similarly, features of the elevator system described above may also be applied to the method and associated examples set out above.

According to another aspect of the present disclosure there is provided a computer program product comprising computer-executable instructions, optionally embodied in a non-transitory computer readable medium, which, when read by a machine, cause the machine to perform the method according to any one of the embodiments described above.

According to a further aspect of the present disclosure there is provided a (non-transitory) computer readable medium having the computer program product as described above stored therein.

BRIEF DESCRIPTION OF THE DRAWINGS

Certain examples of the present disclosure will now be described with reference to the accompanying drawings, in which.

DETAILED DESCRIPTION

Figure 1:
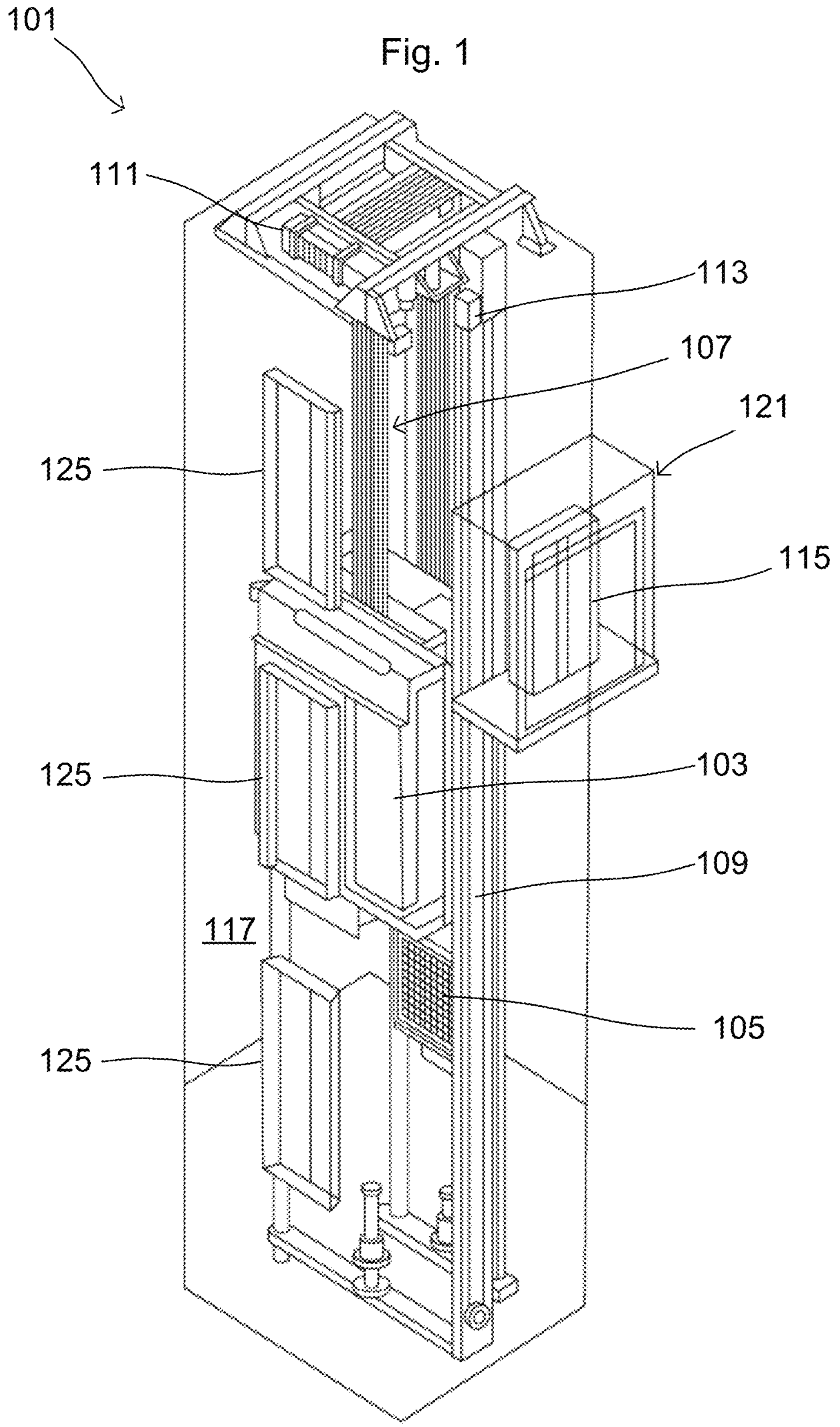
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, an elevator machine 111, an encoder 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the elevator machine 111, which is part of an overhead structure of the elevator system 101. The elevator machine 111 is configured to control movement between the elevator car 103 and the counterweight 105, and thus control the position of the elevator car 103 within the elevator shaft 117. The encoder 113 may be mounted on a fixed part at the top of the elevator shaft 117, such as on a support or guide rail, and may be configured to provide position signals related to a position of the elevator car 103 within the elevator shaft 117. In other embodiments, the encoder 113 may be directly mounted to a moving component of the elevator machine 111, or may be located in other positions and/or configurations as known in the art. The encoder 113 can be any device or mechanism for monitoring a position of an elevator car and/or counter-weight, as known in the art.

The controller 115 is located, as shown, in a controller room 121 of the elevator shaft 117 and is configured to control the operation of the elevator system 101, and particularly the elevator car 103. For example, the controller 115 may provide drive signals to the elevator machine 111 to control the acceleration, deceleration, levelling, stopping, etc. of the elevator car 103. The controller 115 may also be configured to receive position signals from the encoder 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The elevator machine 111 may include a motor or similar driving mechanism. The elevator machine 111 may be configured to include an electrically driven motor. The power supply for the motor may be any power source, including a power grid, which, in combination with other components, is supplied to the motor. The elevator machine 111 may include a traction sheave that imparts force to tension member 107 to move the elevator car 103 within elevator shaft 117.

Although shown and described with a roping system including a tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes. Features of the elevator system 101 may be applied to the elevator system described below.

Figure 2:
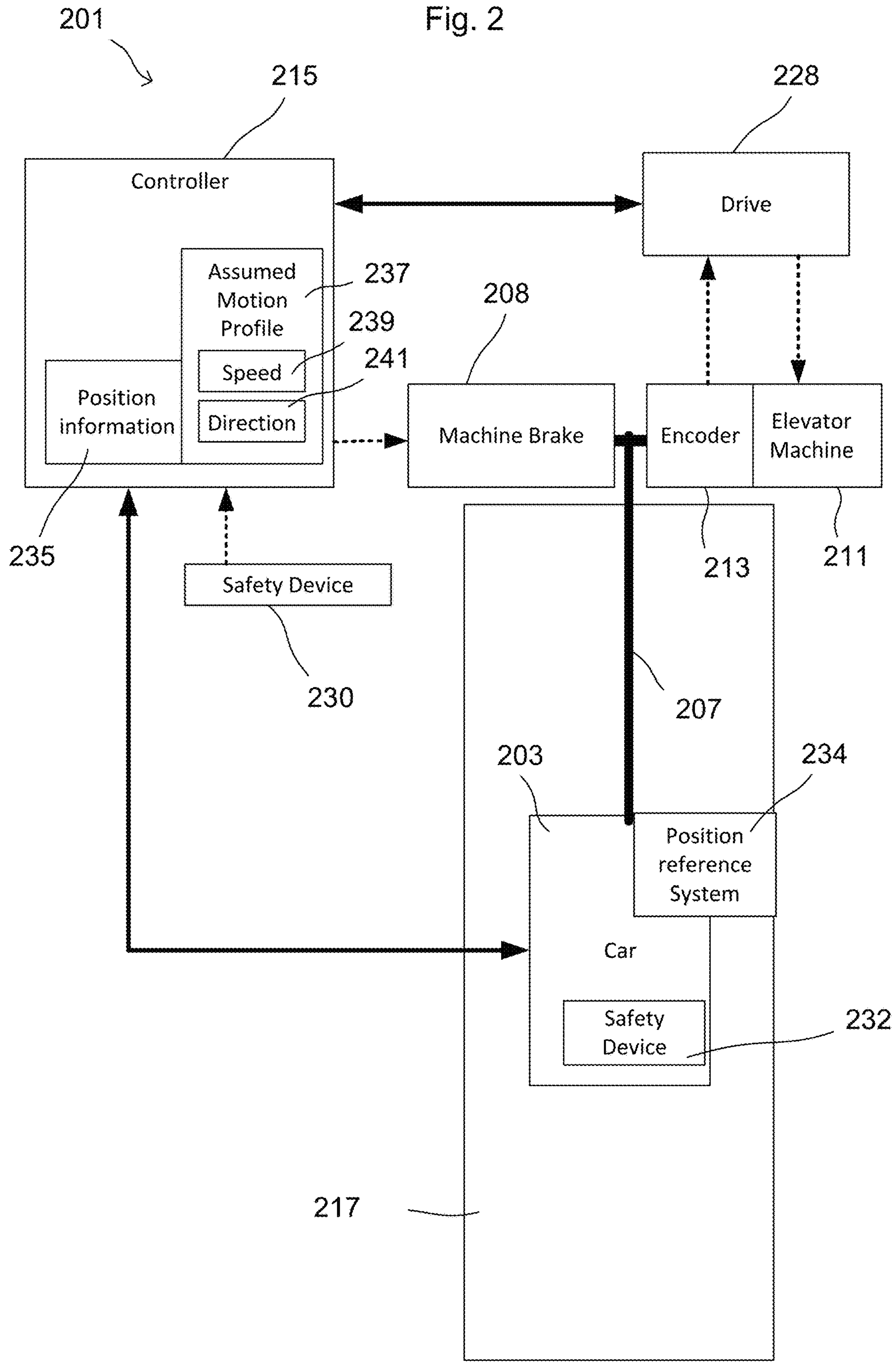
FIG. 2 is a schematic illustration of an elevator system in accordance with an example of the present disclosure.

FIG. 2 shows a schematic illustration of an elevator system in accordance with the present disclosure. As shown, the elevator system 201 comprises an elevator car 203 which is movable in an elevator shaft 217 between a plurality of landings. The elevator car 203 is coupled to a tension member 207 which is driven by an elevator machine 211. The elevator machine 211 is thus configured to move the elevator car 203, via the tension member 207, in the elevator shaft 217.

A brake 208, in the form of a machine brake, is arranged to act directly on the elevator machine 211 such that when the brake 208 is applied movement of the elevator machine 211 is stopped, and consequently the elevator car 203 is stopped from moving within the elevator shaft 217. Whilst the brake 208 illustrated is a machine brake 208, any other form of brake that can suitably stop movement of the elevator car 203 within the elevator shaft 217 may also be used.

The elevator system 201 comprises a controller 215 configured to control movement of the elevator car 203. The controller 215 is operatively connected to a drive 228 which in turn is connected to the elevator machine 211 to control operation of the elevator machine 211, and thus control movement of the elevator car 203 within the elevator shaft 217. The drive 228 is a separate controller which is configured to control the elevator machine 211. An encoder 213 is arranged to measure the position and speed of the elevator car 203, based on movement of the elevator machine 211. The encoder 213 is operatively connected to the drive 228, which is coupled to the controller 215, thereby allowing the controller 215 to suitably control the elevator machine 211 to drive the elevator car 203 in the desired manner The encoder 213 may be used to determine the position, speed, acceleration, deceleration of the elevator car 203, in conjunction with a position reference system 234, as will be described in more detail below.

A safety device 230 is operatively coupled to the controller 215. The safety device 230 may, for example, be connected to the controller 215 via a wired or wireless connection. Whilst the safety device 234 is illustrated as a single safety device 230, it may comprise a plurality of safety devices. The safety device 230 may monitor a part of the elevator system, for example the opening of a landing door. The safety device 230 may correspond to a particular position, e.g. positional zone, within the elevator shaft 217.

A further safety device 232 is part of the elevator car 203 and may function to monitor a status of the elevator car 203. For example, the safety device 232 may be an emergency stop button provided within the elevator car 203, a load sensor configured to measure a load within the elevator car, or indeed any other appropriate safety device. Similarly to the safety device 230 described above, the further safety device 232 is merely illustrative, and any number of further safety devices 232 may be provided. The further safety device 232 in the elevator car 203 may be in communication with the controller 215 via any suitable means, e.g. via a wired or wireless connection.

As discussed above in the summary section, the safety devices 230, 232 may comprise any device which is capable of monitoring the elevator system. For example, the safety devices 230, 232 may comprise at least one of: switches, load sensors, speed sensors, emergency stop buttons or virtual switches formed by a position reference system and associated software etc.

Whilst not depicted, the safety devices 230, 232 may be arranged as part of a safety chain, i.e. the safety devices 230, 232 may be operatively coupled either physically, or electronically within the controller 215, such that the triggering of any one of the safety devices 230, 232 causes the stopping of the elevator car 203. Similarly, resumption of service of the elevator car 203 may require all of the safety devices 230, 232 within the safety chain to be in a safe state. The safety devices 230, 232 may also be suitably referenced so that the controller 215 can determine the type, position and/or purpose of any given safety device 230, 232. As discussed in detail in the summary section, this information may be used when determining whether to allow the elevator car 203 to move following the triggering of one of the safety devices 230, 232.

The elevator system 201 further comprises a position reference system 234. The position reference system 234 may be an absolute position reference system such that it is capable of indicating the absolute position of the elevator car on its own, or when coupled with the encoder 213. Parts of the position reference system 234 may be distributed between the elevator car 203 and the elevator shaft 217, as shown. For example, the position reference system 234 may comprise a sensor, e.g. a camera or hall sensor(s), arranged to read information from within the elevator shaft 217. The position reference system 234 may comprise any suitable system that is capable of determining a position, e.g. an absolute position, of the elevator car 203 within the elevator shaft. The position reference system 234 may be in communication with the controller 215 in any suitable manner Through coupling of the position reference system 234 and the controller 215, the controller 215 thus has access to positional information 235 of the elevator car 203.

In order to calculate the potential positions, in the event of a loss of actual position of the elevator car 203, the controller 215 may comprise an assumed motion profile 237 stored therein. The assumed motion profile 237 may then be used, e.g. with the last known position of the elevator car 203 obtained from the position information 235, in order to calculate potential positions of the elevator car 203. As depicted, the assumed motion profile 237 may comprise an expected speed 239 and an expected direction of travel 241 component. The expected speed 239 may comprise a speed profile which varies based on the time elapsed since the loss of positional information. Additionally, the speed profile may also depend on the initial direction of the elevator car 203. Similarly, the expected direction of travel 241 component may also vary depending on the time elapsed since loss of positional information and may also vary based on the initial speed of the elevator car 203 when the actual positional information is lost. The assumed motion profile 237 may be updated based on characteristics of the elevator system 201, for example the direction of movement of the elevator car 203 at a point at which its position is lost.

Figure 3:
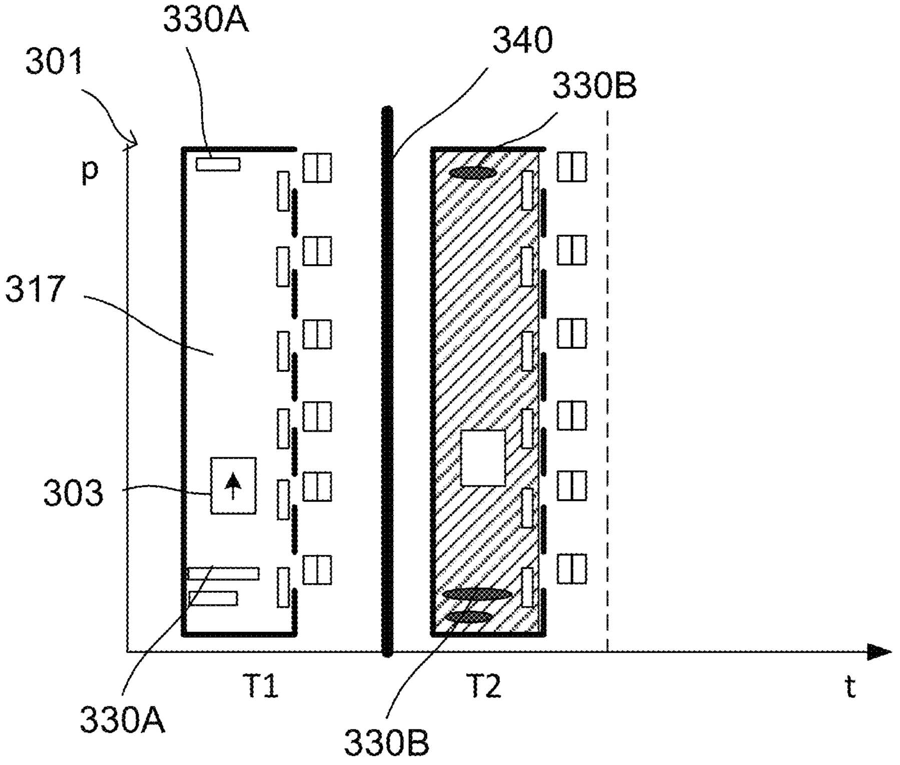
FIG. 3 is an illustration of a prior art elevator system for comparison purposes.

For comparison purposes, FIG. 3 shows the operation of a prior art elevator system 301 operated in accordance with prior art techniques. FIG. 3 shows a prior art elevator system 301 plotted at two different points in time, t, with the position of the elevator system's 301 components plotted against vertical position p, within the elevator shaft 317. Illustrated components of the prior art elevator system 301 include the elevator shaft 317, the elevator car 303, inactive safety devices 330A, i.e. safety devices which have not been triggered, as well as active safety devices 330B, i.e. safety devices which are triggered and which cause the stopping of the elevator car 303.

At time T1, the position of the elevator car 303 within the elevator shaft 317 is known. However, at the time indicated by the dashed line 340, the actual position of the elevator car 303 is lost. Accordingly, as shown at time T2, despite the elevator car 303 being in the same position as time T1, the system 301 assumes that the elevator car could be anywhere within the elevator shaft 317, as illustrated by the hatched marking throughout the entire elevator shaft 317. This results in the immediate triggering of all virtual position related safety devices within the elevator shaft 317. This may, for example, include the uppermost and lowermost safety devices, as indicated by the uppermost and lowermost active safety devices 330B.

Consequently, any further movement of the elevator car is stopped. As is clearly visible in FIG. 3, the elevator car 303 is at a significant distance from at least the lower active safety device 330B and the upper active safety device 330B, and so there is no need to stop the elevator car 203 so quickly. This therefore results in a nuisance for users of the elevator system who are trapped within the elevator car 303, or delayed access to the elevator car 303, due to the unnecessary stopping of the elevator car 303.

This is contrasted to the present invention which is illustrated in the following Figures. FIGS. 4 to 9 each illustrate a plot of the elevator system 201 including the elevator car 203, within the elevator shaft 217, at six different points in time. The elevator system 201 in each Figure is plotted at times T1, T2, T3, T4, T5 and T6 on a graph of time, t, against position, p within the elevator shaft 217. Only the elevator system 201 including the elevator shaft 217, and associated components, at the first time T1 is labelled for clarity purposes. The elevator shaft 217 comprises six landings 225, each with corresponding doors. Of course, this is merely exemplary and the elevator system 201 may comprise any number of landings 225.

Included on each Figure is a key illustrating key parts of the plot. Features of the key are described below for completeness. The square with a line therethrough is indicative of a closed door 242 and the blank square represents an open door 244. The elevator system 201 also comprises a number of safety devices 230. The safety devices 230 are illustrated in three different states. The blank ellipses represent an active safety device 230A, i.e. a safety device outputting a signal indicative of a potential hazard. The solid ellipses, both horizontal and vertical, represent an active and hazardous safety device 230B, i.e. a safety device which outputs an active signal and which is also in a position which corresponds to a potential position of the elevator car 203. The blank rectangles, both vertical and horizontal, represent an inactive safety device 230C, i.e. a safety device which is not indicating a potential hazard. The solid continuous line 252 is indicative of a point in time at which a loss of actual position of the elevator car 203 occurs, and the dashed line 254 is indicative of a point in time at which the elevator car's 203 actual position is recovered. The hatched marking is indicative of the potential positions 256 of the elevator car 203 when the actual position has been lost, which may be calculated by the controller 215. In each of the Figures, the illustrated position of the car 203 within the elevator shaft 217 represents the actual position of the elevator car 203 at any of the given times.

As depicted, each of the landings 225 comprises a door which may be either a closed door 242 or an open door 240. Each of the doors 225 may also comprise a corresponding safety device 230. When the door is a closed door 242, the corresponding safety device 230 is an inactive safety device 230C. When the door is an open door 244, the safety device 230 may either be an active safety device 230A or an active and hazardous safety device 230B, depending on the calculated potential positions 256. The safety devices 230 corresponding to the doors may be operatively coupled to the doors themselves such that their state is determined by the position of the doors. Additionally, there may be safety devices 230 at the uppermost and lowermost portions of the elevator shaft 217. These safety devices 230 in the uppermost and lowermost portions of the elevator shaft may be virtual safety devices whose state is determined by the position, or potential position, of the elevator car 203 within the elevator shaft 217.

The potential positions 256 which are calculated in the following examples may be considered to correspond to positional zones within the elevator shaft 217, for example the potential positions 256 may correspond to zones, e.g.

landings 225, within the elevator system 201. Alternatively, the potential positions 256 may instead be in the form of a distance from a reference point within the elevator system 201 and thus the potential positions 256 may include any position within the elevator shaft 217, including positions between different landings 225 and other regions within the elevator shaft 217.

Figure 4:
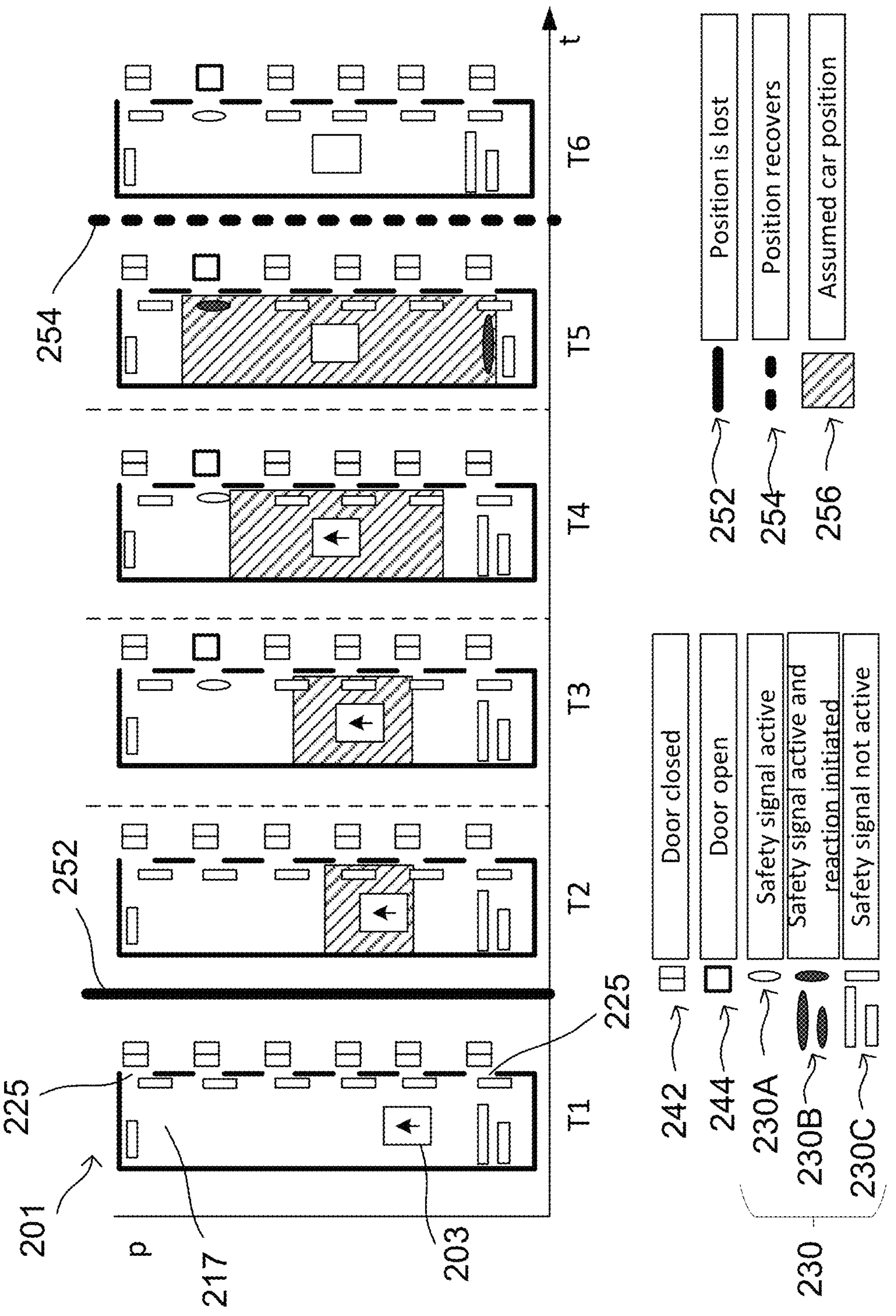
FIG. 4 is an illustration of the elevator system shown in FIG. 2 in operation when the actual position of the elevator car is lost and when a landing door is opened whilst the position is lost.

FIG. 4 illustrates the elevator system 201 and method in accordance with the present disclosure. FIG. 4 shows a plot of the elevator car 203 within the elevator shaft 217, at six different points in time and wherein a safety device 230 is triggered during the loss of actual positional information.

Operation of the elevator system 201 will now be described with reference to FIG. 4, and with reference to the parts of the elevator system 201 shown in FIG. 2. At time T1, the actual position of the elevator car 203 is known, and none of the safety devices 230 in the elevator shaft 217 are triggered, as illustrated by the inactive safety devices 230C throughout the entire elevator system 201. After time T1, the actual position of the elevator car may be lost, e.g. due to the position reference system 234 and/or the encoder 213 no longer being capable of providing an actual position of the elevator car 203. The actual position of the elevator car is 203 lost at the time indicated by the solid line 252. This loss of actual position may be detected by the controller 215 which may be configured to monitor the actual position of the elevator car 203 using the position reference system 234.

The loss of positional information results in the controller 215, shown in FIG. 2, calculating potential positions 256 of the elevator car 203. In the example shown in FIG. 4, the elevator car 203 was initially moving upward at the point of the position loss. Accordingly, the controller 215 may use the last known position from the positional information 235, along with the assumed motion profile 237 to calculate at least one potential position of the elevator car 203. In calculating this position, the controller 215 may use an expected direction of travel 241 of the elevator car 203 and an expected speed 239 which form part of the assumed motion profile 237. The expected direction of travel 241 may include a downward direction which indicates that at least for a certain period of time the elevator car 203 will be travelling downward. The potential positions 256 of the elevator car 203 may then be calculated based on the time elapsed since the loss of positional information.

As illustrated, at time T2, the controller 215 has calculated a first potential position 256. This first potential position 256 covers the second and third landings 225 and encompasses the actual position of the elevator car 203. At time T2, all of the safety devices 230 are inactive safety devices 230C, i.e. none of the safety devices 230 have been triggered, and thus the elevator car 203 is allowed to continue to move within the elevator shaft 217.

As time passes from the point of position loss, the controller 215 periodically calculates potential positions 256 of the elevator car 203. The controller may, for example, calculate the potential positions 256 periodically, e.g. once every 5 ms. At time T3, the controller 215 again calculates further potential positions 256 of the elevator car 203. As shown the potential positions 256 of the elevator car 203 at time T3 include a larger range of potential positions 256 within the elevator shaft 217. Additionally, as depicted, at time T3 there is an open door 244. In the example depicted, the open door 244 is on the fifth landing 225. This open door 244 results in an active safety device 230A on the fifth landing 225. However, the active safety device 230A does not correspond to the potential positions 248 calculated by the controller 215, e.g. the active safety device 230A is not at a position which corresponds to the potential positions 256 of the elevator car 203, and thus the controller 215 allows the elevator car 203 to continue moving.

At time T4, the potential positions 256 of the elevator car 203 are calculated again. As shown, these positions may be above or below the actual position of the elevator car 203. This may be the result of the assumed motion profile 237 which accounts for the potential that by time T4, the elevator car 203 could be moving in either direction. At time T5, the potential positions 256 of the elevator car 203 are calculated again. As depicted, at this point, the potential positions 256 encompass the safety device 230 on the fifth landing which is now an active and hazardous safety device 230B. Accordingly, at time T5, the active and hazardous safety device 230B, which is in a position which corresponds to a potential position 256 of the elevator car 203, causes the elevator car 203 to be stopped. This may be achieved by the application of the machine brake 208 to the elevator machine 211.

As depicted, at time T5, the potential positions 256 also encompass a safety device 230 which may be arranged in the pit of the elevator shaft 217. The safety device 230 in the pit may be a virtual safety device, e.g. in the form of a virtual limit switch. Thus, when the potential positions 256 encompass the position of the safety device 230 in the pit, the safety device 230 may also become an active and hazardous safety device 230B which also triggers the stopping of the elevator car 203. Accordingly, as depicted, at time T5 the elevator car 203 is stationary. The elevator car 203 may remain stationary until actual position information of the elevator car 203 is available. As will be appreciated, the elevator car 203 has moved a number of landings 225 since the initial loss of position, and thus any nuisance to the users of the elevator system 201 may have been minimised.

The actual position of the elevator car 203 may be recovered at the time indicated by the dashed line 254. This may, for example, be due to the elevator car 203 having reached a position within the elevator shaft 217 at which the position reference system 234 is able to function properly. Additionally, this may also be due to maintenance having been performed on the elevator system 201, e.g. following cleaning of the position reference system 234. The controller 215 may therefore release the brake 208 and allow the elevator car 203 to move again. As depicted at time T6, following recovery of the elevator car's 203 position, as the active safety device 230A is not adjacent the elevator car 203 or indeed any potential position 256 of the elevator car 203, the elevator car 203 is once again free to move within the elevator shaft 217.

Of course, whilst the actual position of the elevator car 203 is depicted as being recovered at the time indicated by dashed line 254, the position may instead be recovered earlier, e.g. between times T3 and T4, after which the elevator system 201 may then operate in a normal manner based on the actual position information. Accordingly, the stopping of the elevator car at time T5 may be avoided completely.

The above illustrates one exemplary case of the elevator system 201 and method disclosed herein which utilises landing door safety devices which are associated with landings 225 within the elevator shaft 217. Of course, the principles described above may equally apply to any other form of safety device arranged at any suitable position in the elevator system 201. In the example shown, the potential positions 256 may correspond to positional zones which are associated with landings 225 within the elevator system 201. For example, the controller 215 may determine which landings 225, i.e. levels of the elevator system 201, the elevator car 203 could have potentially travelled to. However, in addition or alternatively, the potential positions may comprise a distance from a reference point within the elevator system 201, e.g. from a base of the elevator shaft 217.

In the example described above, the assumed motion profile 237 may comprise an expected speed 239 which is equivalent to the elevator car 203 moving at a maximum possible speed. Of course, any other expected speed 239 may be used depending on the operational parameters of the elevator system 201. Additionally, the assumed motion profile 237 described above accounts for the likelihood that the elevator car 203 will continue to move upwards, at least initially, and may thus comprise a corresponding acceleration, deceleration, speed or expected direction of movement profile which accounts for such potential movement of the elevator car 203.

When compared to the prior art system as shown in FIG. 3, the system 201 and method disclosed herein, and described above with respect to FIG. 4, advantageously allows an elevator car 203 to continue to move even in the event of a loss of actual positional information. The elevator system 201 is also nonetheless capable of stopping the elevator car following the triggering of a safety device which realistically represents a danger to the users. Further, in allowing the elevator car 203 to continue to move, the elevator system 201 may also recover its positional information, thus permitting continued normal operation without requiring further interaction, e.g. from maintenance personnel. The system 201 and method may, therefore, reduce the number of nuisance events which are experienced by users of the system.

Figure 5:
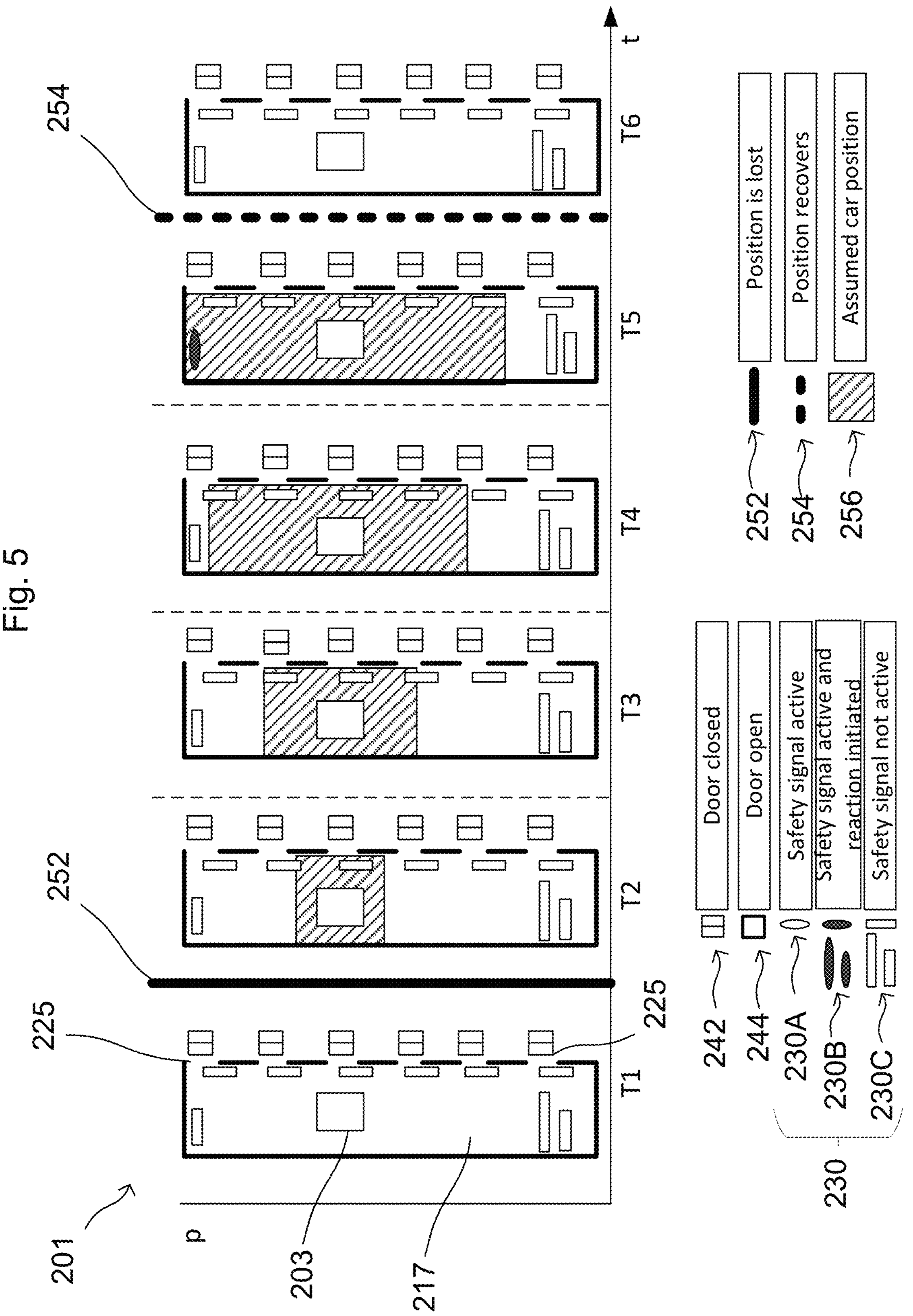
FIG. 5 is an illustration of the elevator system shown in FIG. 2 when the actual position is lost whilst the elevator car is stationary.

FIGS. 5 to 9 illustrate the calculation of potential positions of the elevator car 203 with the elevator car 203 moving in different directions within the elevator shaft 217. FIG. 5 shows the exemplary case whereby the elevator car 203 is stationary when the position of the elevator car 203 is lost. As illustrated, at time T1, the position of the elevator car 203 is known. Following the loss of positional information indicated by line 252, potential positions 256 are then calculated by the controller 215 based on the last known position from the positional information 235 and the assumed motion profile 237. At time T2, the potential position 256 calculated encompass the actual position of the elevator car 203. At time T3, the calculated potential positions not only include a potential position encompassing the elevator car 203, but also a potential position 248 at a level above and below the elevator car 203. Accordingly, when calculating the potential positions 256, the controller 215 may utilise an assumed motion profile which may include an expected direction of travel component which is in both the upward and downward direction immediately following the loss of positional information. This process is repeated at times T4 and T5 in which the number of potential positions 248 increases and thus there is a greater range of positions in the elevator shaft 217 where the elevator car 203 could potentially be.

As illustrated, at time T5, the potential positions 256 includes the uppermost position within the elevator shaft 217. As a result, a safety device 230 at the uppermost portion of the elevator shaft 217 is triggered as indicated by the active and hazardous safety device 230B at the top of the elevator shaft 217. The safety device 230 at the top of the elevator shaft 217 may be a virtual safety device, in the form of a virtual limit switch. As the elevator car 203 is already stationary at this point, the controller 215 may simply prevent the elevator car 203 from being moved.

When the position of the elevator car 203 is recovered, i.e. at the point in time indicated by the dashed line 254, the position of the elevator car 203 is once again known at T6. As all of the safety devices 230 are inactive safety devices 230C, the elevator car 203 may be moved, e.g. in response to an elevator call, within the elevator shaft 217.

Figure 6:
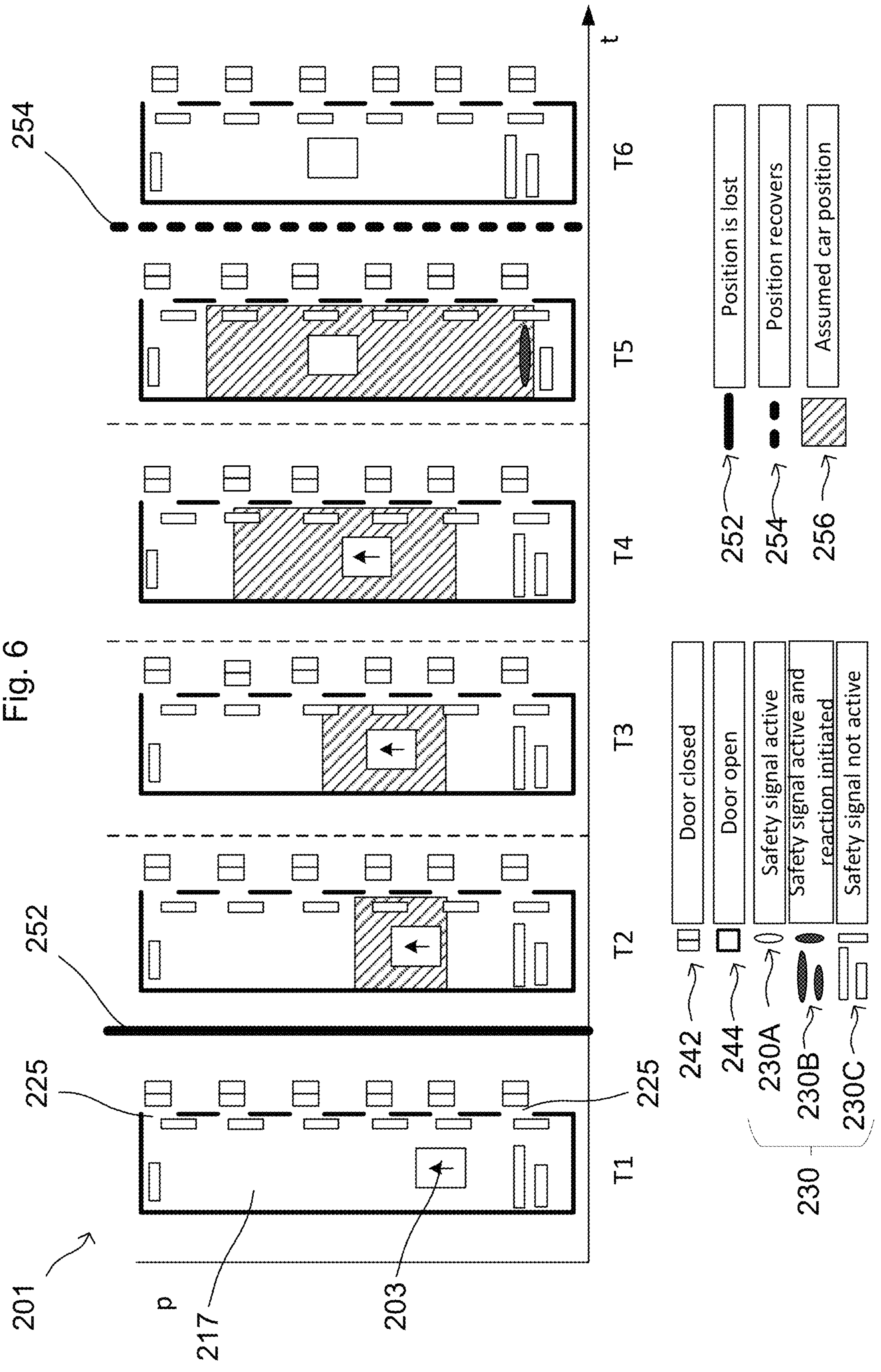
FIG. 6 is an illustration of the elevator system shown in FIG. 2 when the actual position is lost whilst the elevator car is moving upwards.

FIG. 6 shows the exemplary case whereby the elevator car 203 is moving upwards when the position of the elevator car 203 is lost. At time T1, the position of the elevator car is known. At the point in time illustrated by the solid line 252, the position of the elevator car 203 is lost. Accordingly, as the elevator car 203 was initially moving upwards, this information is used as part of the assumed motion profile 237, specifically it forms part of the expected travel direction 241 of the assumed motion profile 237. Thus, the calculated potential position 256 at time T2 is above the position of the elevator car 203 at time T1, because the calculation of the potential position 256 assumes that the elevator car 203 will continue to move upwards, at least initially. This continues at time T3 at which it can be seen that the calculated potential positions 256 include further positions in the upward direction. At time T4, further potential positions 256 are calculated. At this point in time, based on the assumed motion profile 237, it may be the case that the elevator car 203 could theoretically have continued to move upwards, but also that the elevator car 203 could now have begun to move downward. In other words, the assumed motion profile 237 may include both upward and downward components of direction of travel at time T4. Accordingly, as depicted, the calculated potential positions 256 now begin to incorporate positions in a downward direction.

At time T5, as illustrated, the controller 215 has calculated further potential positions 248 both in an upward and downward direction. In all of the times from T2-T5, at least one of the potential positions 248 corresponds to the actual position of the elevator car 203, as illustrated. Accordingly, the calculated potential positions 248 include the actual position of the elevator car 203 thus meaning that any safety device 230 which is triggered and corresponds to any of the calculated potential positions 256, will cause the elevator car 203 to be stopped and thus ensure the safety of the users of the elevator system 201. At time T5, the potential positions 245 encompass a safety device 230 at the bottom of the elevator shaft 217. This safety device 230 may be a virtual limit switch arranged within the pit of the elevator shaft 217. As depicted, the safety device 230 is thus an active and hazardous safety device 230B which is within the potential positions 256 of the elevator car 203. Accordingly, at this point, the elevator car 203 may be stopped, e.g. through application of the brake 208 to the elevator machine 211.

At the point in time indicated by the dashed line 254, the position of the elevator car 203 is recovered and at time T6 none of the safety devices 230 are active, i.e. all the safety devices 230 in the elevator system 201 are inactive safety devices 230C, and thus the elevator system 201 may then continue to operate in a normal manner.

Figure 7:
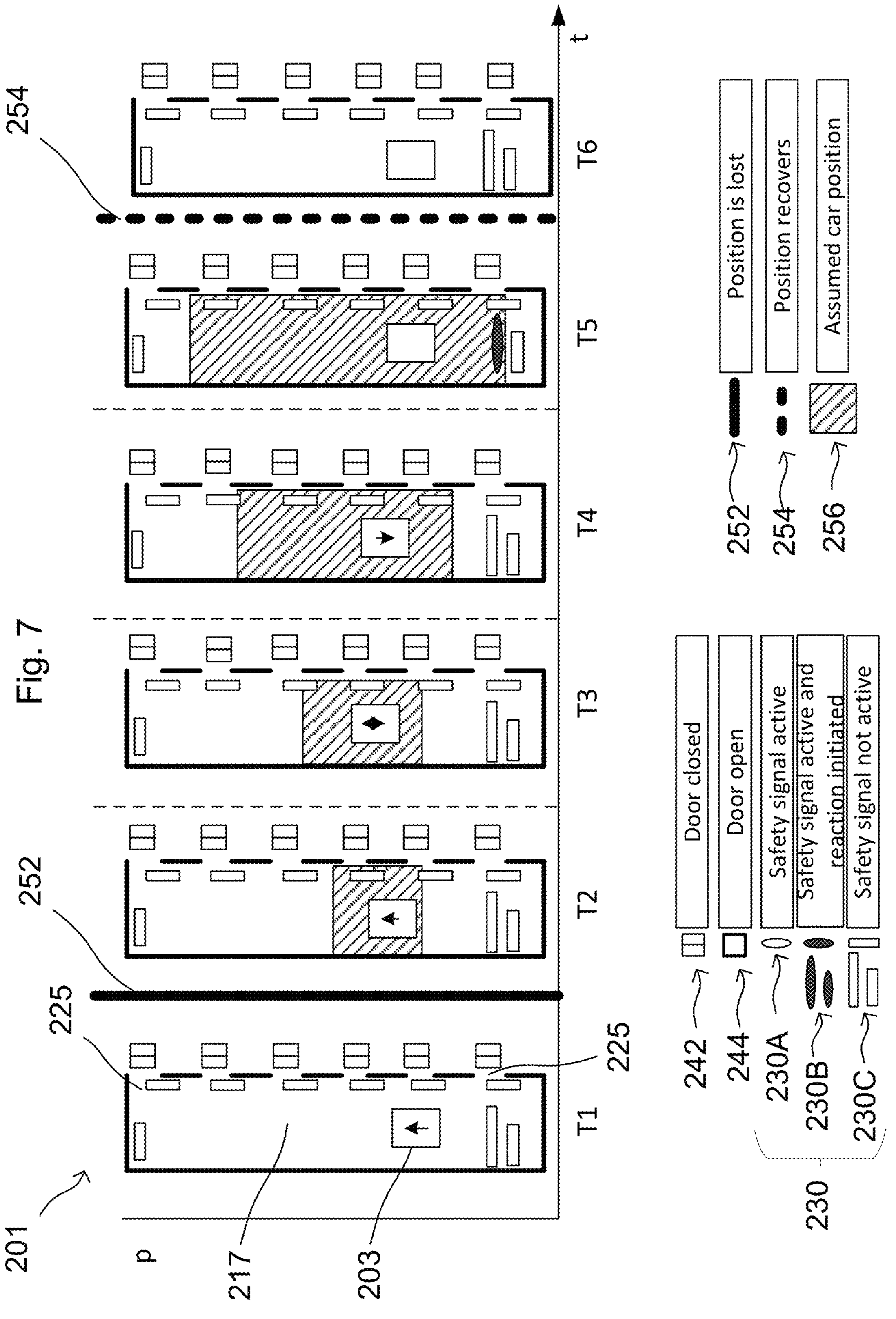
FIG. 7 is an illustration of the elevator system shown in FIG. 2 when the actual position is lost whilst the elevator car is initially moving upwards and subsequently changes to move downwards.

FIG. 7 shows the exemplary case whereby the elevator car 203 is initially moving upwards, at the point at which its position is lost, but subsequently moves downwards whilst its actual position is remains unknown. At time T1, the position of the elevator car 203 within the elevator shaft 217 is known. At the point in time indicated by the solid line 252, the actual position of the elevator car 203 can no longer be determined. Accordingly, at time T2 the potential position 256 of the elevator car 203 is calculated. This is achieved based on the last known position of the elevator car 203, which corresponds to the position at time T1, as well as an assumed motion profile 237 which includes an expected travel direction 241 component. As depicted, the potential position 256 includes one level up from the known position at time T1. Accordingly, at least at time T2, the assumed motion profile 237 incorporates the upward travel of the elevator car 203. Similarly, at time T3, the potential positions 248 of the elevator car 203 include the level calculated at time T2, as well as the next level up. However, as depicted, at time T3, the direction of travel of the elevator car 203 reverses, and the elevator car 203 begins to travel in a downward direction. This reversal of direction of the elevator car 203 may be accounted for by the assumed motion profile 237 including an expected direction of travel component, which may be in the form of a profile which varies with time. Accordingly, at time T4, the calculated potential positions 256 now include further potential positions 256 at levels above that calculated at time T3 and also potential positions 256 at levels below the position calculated at T3, i.e. in the downward direction.

This process is further repeated at time T5 at which the potential positions 256 now include a significant portion of the elevator shaft 217. As depicted, at time T5, the potential positions 256 encompass a safety device 230 which may be located in the pit of the elevator shaft 217. The safety device 230 may be a virtual limit switch, and due to the potential positions 256 encompassing the lowermost safety device 230, this safety device 230 may become an active and hazardous safety device 230B which triggers stopping of the elevator car 203. Accordingly, at time T5, the elevator car 203 may be stopped, e.g. through application of the brake 208 to the elevator machine 211.

By taking into account the potential for the direction of the elevator car 203 to change, the calculated potential positions 256 may include positions at which the elevator car 203 may have moved to. As illustrated, despite the elevator car 203 changing direction during its travel, the potential positons 256 nonetheless include potential positions 256 at which the elevator car 203 is actually present. This ensures the safety of the users of the elevator system 201.

As with previous examples, at the point in time illustrated by dashed line 254 the actual position of the elevator car 203 is recovered and thus the position of the elevator car 203 is once again accurately known. The elevator system 201 may then continue to operate in a normal manner.

Figure 8:
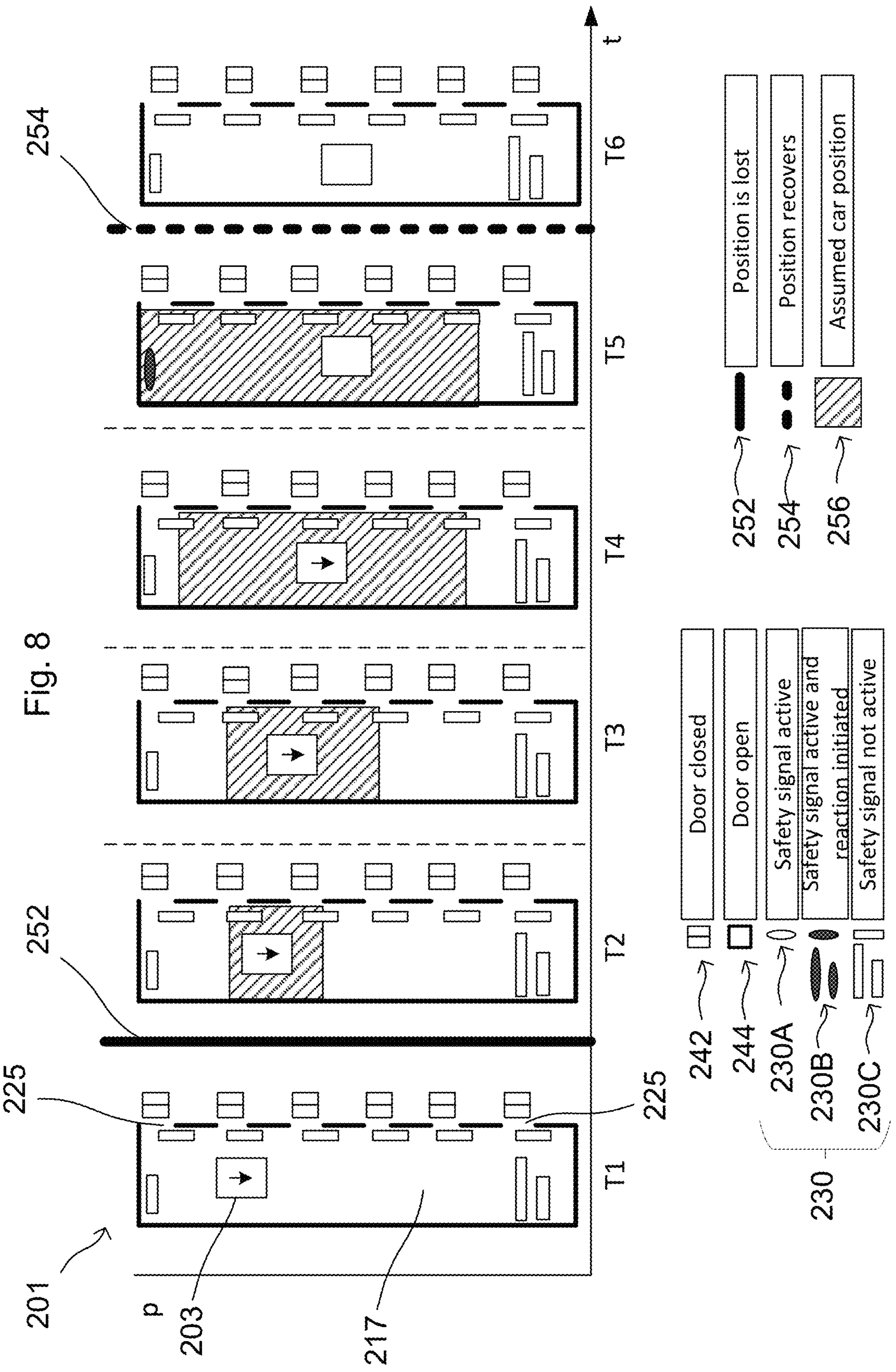
FIG. 8 is an illustration of the elevator system shown in FIG. 2 when the actual position is lost whilst the elevator car is moving downwards.

FIG. 8 illustrates the exemplary case whereby the elevator car 203 is moving downwards when the position is lost. In this instance, the elevator system 201 operates in a similar manner to that described above with respect to FIG. 6. However, unlike FIG. 6 in which the expected travel direction 241 is initially upwards, in the example of FIG. 8 the expected travel direction 241, at least initially, is downward. At time T1, the position of the elevator car 203 is known. At the point in time indicated by the solid line 252 the actual position of the elevator car 203 is lost. Thus, at time T2, a potential position 256 of the elevator car 203 is calculated by the controller 215. As depicted, based on the expected travel direction 241 being, at least initially, downward, the potential position 256 is in a downward direction. At time T3, further potential positions 256 of the elevator car 203 are calculated. As depicted, the assumed motion profile 237 assumes that the elevator car 203 will continue to be moving downwards at this point in time, and thus further potential positions 256 in the downward direction are calculated.

At time T4, further potential positions 256 are calculated. At this point, the assumed motion profile 237 may account for the possibility that the movement direction of the elevator car 203 may have changed. Accordingly, at time T4 the calculated potential positions 256 include potential positions 256 above and below the potential positions 256 calculated at time T3, i.e. in both the upward and downward directions. At time T5, further potential positions 256 are calculated in a similar manner to that at time T4, i.e. in both the upward and downward directions. As depicted, the potential positions 256 of the elevator car 203 at time T5 include a potential position 256 of the elevator car 203 at the uppermost portion of the elevator shaft 217.

The elevator shaft 217 may comprise a sensor device 230, e.g. a virtual limit switch, at the top of the elevator shaft 217. Thus, at time T5 in which the potential positions 256 include the top of the elevator shaft 217, the sensor device 230 at the top of the elevator shaft may become an active and hazardous sensor device 230B, which may cause the elevator car 203 to be stopped, e.g. through application of the brake 208 to the elevator machine 211. At the point in time indicated by dashed line 254, the actual position of the elevator car 203 may be recovered, and thus at time T6 the sensor device 230 at the top of the elevator shaft 217 is no longer active, as indicated by the inactive sensor device 230C. The elevator system 201 may then continue to operate in a normal manner, e.g. by allowing the elevator car 203 to move freely within the elevator shaft 217.

Figure 9:
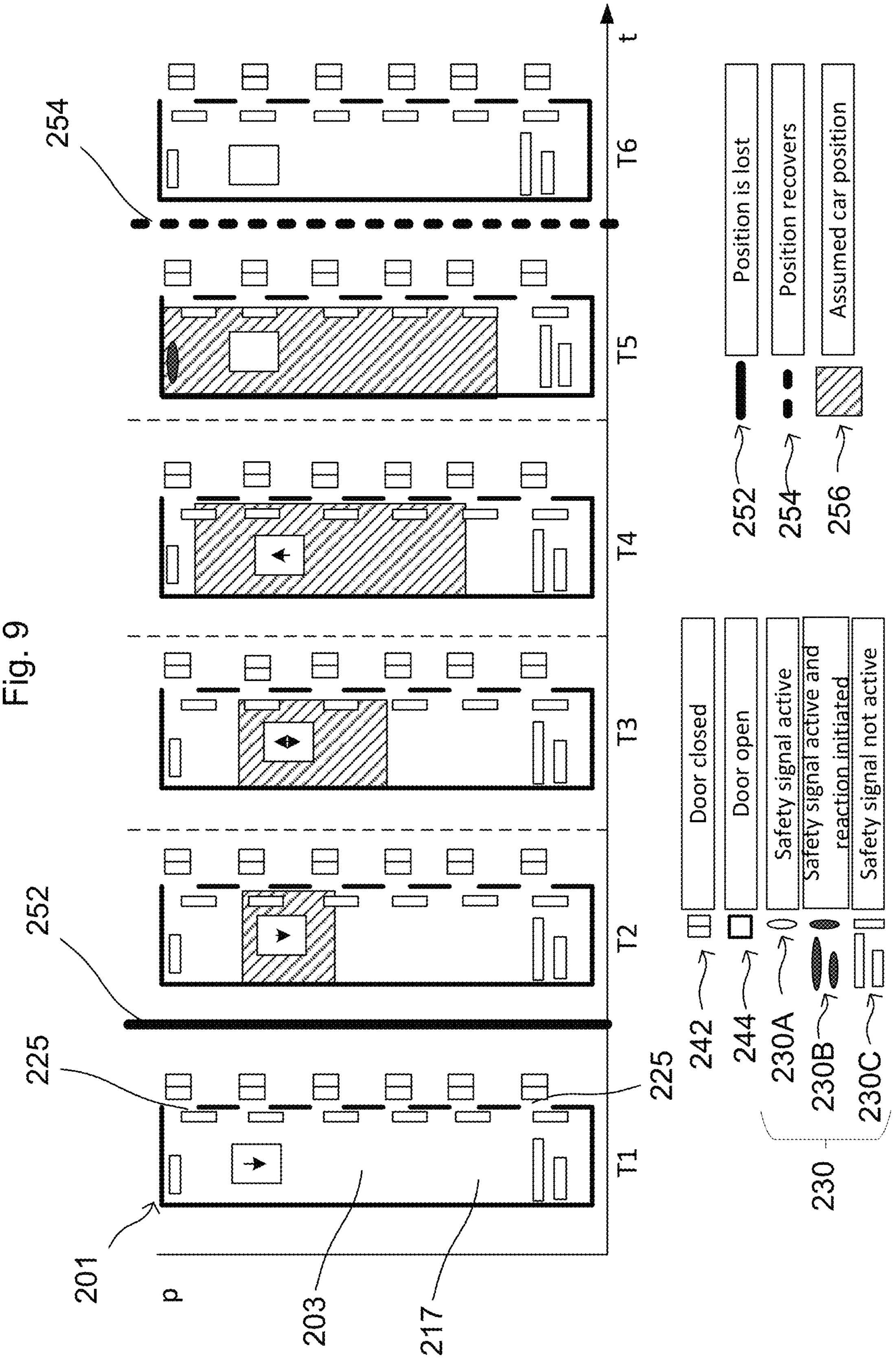
FIG. 9 is an illustration of the elevator system shown in FIG. 2 when the actual position is lost whilst the elevator car is initially moving downwards and subsequently changes to move upwards.

FIG. 9 illustrates the exemplary case whereby the elevator car 203 is initially moving downwards, but reverses direction at a point when its position is not accurately known. At time T1, the position of the elevator car 203 is known. At the point in time indicated by the solid line 252, the actual position of the elevator car 203 is lost. Thus, at time T2, the controller 215 calculates a potential position 256 using the assumed motion profile 237 and optionally the last known position of the elevator car 203. At time T2, the calculated potential position 256 includes potential positions in a downward direction, as the assumed motion profile 237 may account for the fact that the elevator car 203 was moving in the downward direction at the point of position loss. At time T3, further potential positions 256 are calculated. As depicted, these are also in the downward direction as the assumed motion profile 237 may assume that the elevator car 203 is continuing to move downward at this point. This may, for example, be due to knowledge that it would take a certain distance or time for the elevator car 203 to slow and reverse direction based on its movement profile at the point of position loss at time T1.

Further, as with the exemplary case described above with respect to FIG. 7, the assumed motion profile 237 may account for the potential for the elevator car 203 to change its direction of travel. Thus, at time T4, further potential positions 256 are calculated which include potential positions 256 above and below the potential positions 256 calculated at time T3. This therefore accounts for the fact that the travel direction of the elevator car 203 may change.

At time T5, further potential positions 256 are calculated on the same basis as at time T4. As depicted, at time T5 the potential positions 256 may include the uppermost portion of the elevator shaft 217. Similarly to the example described in FIG. 8, the elevator system 201 may comprise a safety device 230, e.g. a virtual limit switch, arranged at the top of the elevator shaft 217. Accordingly, when the potential positions 256 encompass this uppermost position at which the elevator car 203 could be at, this may cause the safety device 230 at the uppermost portion of the elevator shaft 217 to become an active and hazardous safety device 230B, which causes the stopping of the elevator car 203. This stopping may, for example, be achieved by the controller 215 causing the brake 208 to be applied to the elevator machine 211.

At the point in time indicated by the dashed line 254, the actual position of the elevator car 203 is recovered. As the elevator car 203 is not at the uppermost position in the elevator shaft, at time T6, sensor devices 230 are all inactive safety devices 230C. As discussed above with respect to earlier Figures, at each of the times T2-T5 in the example of FIG. 9, there is always a potential position 256 which corresponds to the actual position of the elevator car 203. Thus the triggering of a safety device 230 which corresponds to any one of these potential positions 256 will cause the stopping of the elevator car 203 based on the potential positions 256 of the elevator car 203, thereby ensuring the safety of the users of the elevator system.

In the exemplary cases described above with reference to FIGS. 5-9, the elevator system 201 allows the elevator car 203 to continue moving, even following the loss of actual positional information. This may therefore avoid nuisance events which may improve the experience of users of the elevator system 201.

Additionally, in the examples described above, the assumed motion profile 237 may also account for the potential that the elevator car 203 may continue to move, at least by a small amount, during the stopping of the elevator car. Accordingly, potential positions of the elevator car 203 may continue to be calculated until the elevator car has come to a complete stop. The assumed motion profile 237 may include a braking profile which may be used when calculating potential positions 256 following the stopping of the elevator car 203. The braking profile may, for example, include a deceleration component which indicates deceleration of the elevator car 203.

The examples described above are merely intended to illustrate the presen invention and may include a number of modifications within the scope of the present invention. For example, the assumed motion profile 237 may operate using any suitable parameters. For example, the assumed motion profile 237 may always assume that the elevator car 203 can travel in either direction. Alternatively, the assumed motion profile 237 may account for the fact that the elevator car 203 may change direction, and the point at which this occurs may vary depending on a number of different factors including the type of elevator installation, the motion of the elevator car 203 at the point at which its position is lost, along with other suitable factors. For example, if the elevator car 203 was moving slowly as at the point of position loss, the assumed motion profile 237 may work on the basis that the elevator car 203 may change direction in a shorter distance or shorter time. Similarly, if the elevator car 203 was moving quickly at the point of position loss, the time or distance at which the elevator car 203 may change direction may be increased. The assumed motion profile 237 may also take into account acceleration and deceleration profiles of the elevator car 203 which may be different between different elevator installations and/or the movement of the elevator car 203 at the point of positional loss.

Accordingly, it will be appreciated by those skilled in the art that examples of the present disclosure provide an improved elevator system and method which is capable of continuing operation even when an actual position of the elevator car of the elevator system is not known. While specific examples of the disclosure have been described in detail, it will be appreciated by those skilled in the art that the examples described in detail are not limiting on the scope of the disclosure.

What is claimed is:

1. An elevator system (201) comprising:

an elevator car (203) arranged within an elevator shaft (217);

a controller (215) configured to control movement of the elevator car (203);

a position reference system (234; 213) configured to provide a position of the elevator car (203) within the elevator shaft; and at least one safety device (230) configured to indicate, when triggered, a potential hazard within the elevator system (201);

wherein when an actual position of the elevator car (203) cannot be determined using the position reference system (234; 213), the controller (215) is configured to:

calculate at least one potential position (248) of the elevator car (203) based on an assumed motion profile (237) of the elevator car (203); and allow the elevator car (203) to move whilst no safety device (230), which corresponds to the at least one potential position (248) of the elevator car (203) is triggered; and stop movement of the elevator car (203) when a safety device (230) which corresponds to the at least one potential position of the elevator car is triggered;

wherein the at least one safety device (230) comprises a virtual upper limit switch and a virtual lower limit switch, wherein the virtual upper limit switch or the virtual lower limit switch are automatically triggered when the at least one potential position (248) of the elevator car (203) corresponds to the uppermost or lowermost portion of the elevator shaft (217), respectively.

2. The elevator system (201) as claimed in claim 1, wherein the assumed motion profile (237) comprises an elevator car speed component (239) which comprises a maximum possible speed of the elevator car (203).

3. The elevator system (201) as claimed in claim 1, wherein the motion profile (237) comprises a direction of travel (241) component of the elevator car (203).

4. The elevator system (201) as claimed in claim 1, wherein the at least one potential position (248) of the elevator car (203) comprises a plurality of potential positions (248).

5. The elevator system as claimed in claim 1, wherein calculating the at least one potential position comprises calculating the at least one potential position periodically.

6. An elevator system (201) as claimed in claim 1, wherein each of the at least one potential position (248) corresponds to at least one positional zone within the elevator shaft (217).

7. The elevator system (201) as claimed in claim 1, wherein the position reference system (234; 213) comprises an absolute position reference system (234) configured to provide an absolute position of the elevator car (203) within the elevator shaft (217).

8. The elevator system (201) as claimed in claim 1, wherein the at least one safety device (230) comprises a plurality of safety devices.

9. A method of controlling the operation of an elevator car (203) within an elevator shaft (217) comprising a plurality of safety devices (230) configured to indicate a hazard in the elevator system (201), the method comprising:

monitoring a position of the elevator car (203) using a position reference system (234; 213);

when an actual position of the elevator car (203) cannot be determined from the position reference system (234; 213), calculating at least one potential position (248) of the elevator car (203) based on an assumed motion profile (237) of the elevator car (203); and allowing the elevator car (203) to move when no safety device (230) is triggered which corresponds to the at least one potential position (248) of the elevator car (203), and stopping the elevator car (203) from moving when a safety device (230) is triggered which corresponds to the at least one potential position (248) of the elevator car (203);

wherein the plurality of safety devices (230) comprise a virtual upper limit switch and a virtual lower limit switch, wherein the virtual upper limit switch or the virtual lower limit switch are automatically triggered when the at least one potential position (248) of the elevator car (203) corresponds to the uppermost or lowermost portion of the elevator shaft (217), respectively.

10. The method as claimed in claim 9, wherein the assumed motion profile (237) comprises an elevator car speed (239) comprising a maximum possible speed of the elevator car (203).

11. The method as claimed in claim 9, wherein the assumed motion profile (237) comprises a direction of movement component (241).

12. The method as claimed in claim 9, wherein calculating the at least one potential position (248) comprises calculating a plurality of potential positions (248).

13. The method as claimed in claim 9, wherein the at least one potential position (248) corresponds to positional zones (248) within the elevator shaft (217).

14. A computer program product stored on a non-transitory computer readable medium comprising computer-executable instructions which, when read by a machine, cause the machine to perform the method according to claim 9.

* * * * *